United States Patent [19]

Bompard et al.

[11] Patent Number: 4,889,063
[45] Date of Patent: Dec. 26, 1989

[54] MULTILAYER TEXTILE MATERIAL AND METHOD AND APPARATUS FOR PRODUCING THE SAME

[75] Inventors: Bruno Bompard, Lyons; Christian Debaille, Caluire; Alain Bruyere, Villefontaine, all of France

[73] Assignee: Brochier S.A., Cedex, France

[21] Appl. No.: 939,712

[22] Filed: Dec. 5, 1986

[30] Foreign Application Priority Data

Dec. 5, 1985 [FR] France .................. 85 18054

[51] Int. Cl.⁴ ............... D05B 93/00; B32B 7/08
[52] U.S. Cl. .................. 112/402; 112/420; 112/422; 112/440; 112/121.14
[58] Field of Search .......... 112/412, 415, 440, 405, 112/63, 121.14, 402, 420, 422; 28/101; 66/84 A

[56] References Cited

U.S. PATENT DOCUMENTS

| | | | |
|---|---|---|---|
| 543,964 | 8/1895 | Michell | 112/415 |
| 2,529,575 | 11/1950 | Sailer | 112/63 |
| 3,467,507 | 9/1969 | Andreevskaya et al. | 28/101 X |
| 4,059,468 | 11/1977 | Bouillon | 112/412 X |
| 4,080,915 | 3/1978 | Bompard et al. | 112/412 |
| 4,506,611 | 3/1985 | Parker et al. | 112/440 X |
| 4,567,738 | 2/1986 | Hutson et al. | 112/440 X |

FOREIGN PATENT DOCUMENTS 370600 10/1906 France .

Primary Examiner—H. Hampton Hunter
Attorney, Agent, or Firm—Wenderoth, Lind & Ponack

[57] ABSTRACT

A multilayer textile article for the production of laminated materials has layers each consisting of a two-directional cloth, the layers being joined together by a third thread extending in a direction inclined to the direction in which the threads of the layers extend. According to the invention the third thread forms a continuous stitching (C), the stitching extending helically from one end of the layers to the other.

3 Claims, 2 Drawing Sheets

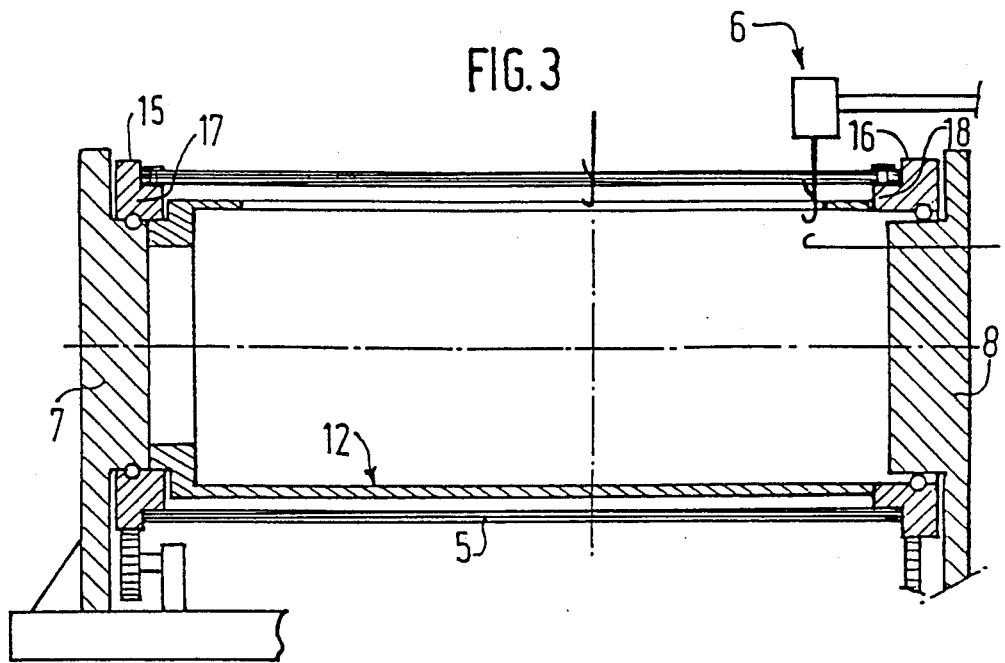
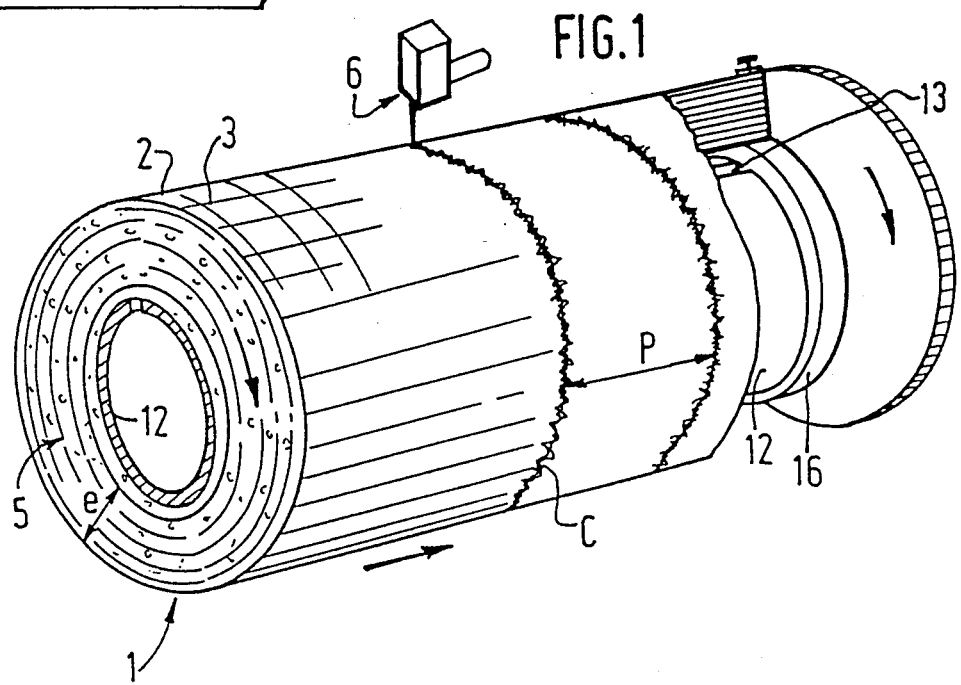

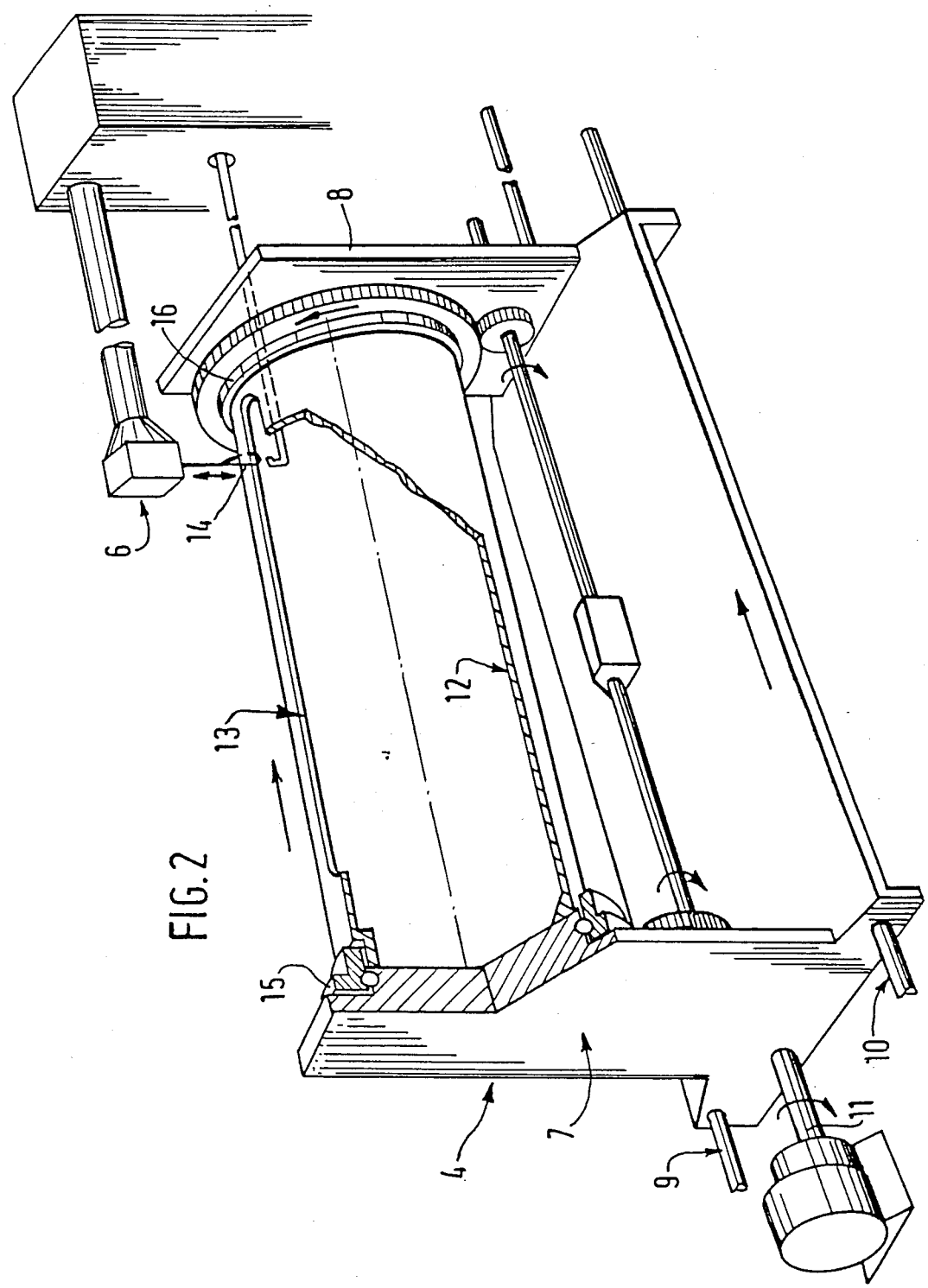

4,889,063

MULTILAYER TEXTILE MATERIAL AND METHOD AND APPARATUS FOR PRODUCING THE SAME

BACKGROUND OF THE INVENTION

The present invention relates to a new type of multilayer textile article which can be used for the production of laminated materials; it also relates to a method and a device for producing material of this kind.

Laminated materials have been known for a very long time and consist of alternately disposed layers of textile material (cloths, nonwoven sheets, etc.) which are impregnated with resin, an assembly of the layers then being heat-treated in order to cause the resin to polymerize and the assembly to become hard.

These materials have been used in numerous applications, either in the form of planar components (plates) or defined by a surface of revolution, with a rectilinear or other generatrix, such as a tube, cone, etc.

So far, various types of multilayer textile structures have been proposed for producing such materials. Among these structures, the one which exhibits the best mechanical characteristics, a very good impact strength and abrasion resistance comprises threads oriented in three different directions, generally perpendicular to each other. Such textile articles are generally referred to by the term "three-dimensional cloths", a term which will be used in the description which follows.

Such three-dimensional cloths may be produced by various processes, the most widely used ones consisting of first forming a two-directional structure by successively stacking either sheets consisting of parallel threads, or woven cloths. The sheets are superposed cross-wise to one another so as to produce good mechanical characteristics in all directions, the third direction being obtained by stitching the superposed sheets in a direction which is perpendicular or oblique to the direction in which the sheets are superposed.

While a method of interconnecting the sheets by stitching to provide threads extending in the third direction of the three-dimensional cloth can be easily employed when the planar articles are to be produced, such a method cannot be easily employed in the manufacture of three-dimensional cloth articles having the shape of a body of revolution, for example cylindrical articles, conical articles, etc.

Various methods of producing such articles have been proposed.

One of these methods is the subject of U.S. Pat. No. 4,080,915 and which, in general, consists of forming, around a support mandrel having a shape corresponding to that of the article to be produced, a superposition of first sheets comprising longitudinal threads extending in a first direction and second sheets comprising parallel circumferential transverse threads extending in a direction which is different from that in which the longitudinal threads in the first series of sheets extend, the superposition being preferably produced by alternately disposing the first and the second sheets. The stack of sheets are interconnected by a third series of threads known as radial threads consisting of parallel stitchings at uniform distances from each other, and generally arranged along the generatrices of the article. For its implementation, a method of this kind requires a complex apparatus, particularly with respect to the construction of the support mandrels, which must be designed so as to be capable of having gaps defined on their surfaces that are sufficient for allowing the passage of a needle during the stitching operation to produce the threads extending in the third direction. When parallel stitchings are produced, the support mandrel has to be rotated stepwise and, each time, a gap must be present below the knitting head. It will be readily understood, therefore, that in this method it is not possible to vary the density of the stitchings readily, since their separation distance is generally uniform.

In addition, in this method, it is virtually out of the question to produce elementary layers of the stack by using two-directional cloths.

To solve this problem of the complexity of the support mandrel, it has been proposed, in U.S. Pat. No. 4,059,468, to dispose a stack of sheets (consisting of parallel threads or of two-dimensional cloths) on a support made of pyrolysable material, and then to stitch the stack of said sheets and the support in the third direction with thread. The support is then removed by heat treatment. A process of this kind overcomes the problems presented by the use of a support mandrel which has gaps as in U.S. Pat. No. 4,080,915, but, on the other hand, the stitchings still extend parallel to the generatrices. Furthermore, the execution of the stitching is complicated since certain precautions need to be taken in order to ensure that the stitched threads interlock within the thickness of the support if loops are not to be formed within the article after the removal of said support by pyrolysis.

SUMMARY OF THE INVENTION

According to the present invention, a new type of three-dimensional multilayer textile articles is provided which can be used to produce shaped articles (cube, cone, etc.) having very good mechanical properties and which, furthermore, may be fabricated by a method which is much simpler and more reliable than the previous processes. The method also forms part of the invention.

In general, therefore, the invention is drawn to a new multilayer textile material for the production of a laminated article in which stacked layers are interconnected or joined together by a third thread extending in a direction inclined with respect to the direction in which the threads in the various layers extend, wherein said third thread forms a continuous stitching, the stitching extending helically from one end of the stacked layers to the other.

The material according to the invention may have various shapes, for example that of a cylinder, a cone, a combination of a cylinder and a cone, etc. Naturally, other, more complex shapes could be produced without departing from the scope of the invention.

Furthermore, the helical stitching may be produced at a constant pitch over the entire length of the article, or, if desired, at a varying pitch. It is possible, therefore, to modify at will the density of the third threads formed by stitching, in accordance with the shape of the article to be produced.

The invention also is drawn to a method for fabricating a three-dimensional article of this kind and to an apparatus for carrying out such a method which method comprises the steps of disposing a stack of layers of two-directional cloths around a stationary mandrel having the shape of the internal section of the article to be produced, stretching the stack between two crown rings, holding the stack at each of its ends so that it may be rotated around said mandrel, and stitching the stack by means of an assembly which is stationary relative to the mandrel.

BRIEF DESCRIPTION OF THE DRAWINGS

The invention and the advantages which it provides will be described below in an illustrative but not limitative manner, with reference to the appended drawings, in which:

FIG. 1 is a perspective view of three-dimensional cloth of the present invention;

FIG. 2 is a perspective view of an apparatus for producing the cloth in FIG. 1 according to the present invention; and FIG. 3 is a longitudinal section view of the apparatus of FIG. 2 showing the way in which stitching is performed through a stack of two-directional cloths according to the present invention.

DETAILED DESCRIPTION OF THE PREFERRED EMBODIMENTS

With reference to FIG. 1, the three-dimensional material according to the invention has the shape of a body of revolution, for example of a cylinder (1), formed by the superposition of a plurality of textile sheets comprising threads (2) which are arranged circumferentially and threads (3) which are arranged on the generatrices of the article. The elementary layers comprising these threads extending in two non-parallel directions will advantageously form a cloth. The third thread is a stitching (C) which passes through the stack, the stitching being characterized according to the invention in that is is continuous and extends spirally from one end of the article to the other.

The pitch P of the stitching can be adjusted as a function of the article to be produced and may vary over the length of the article.

While the foregoing description describes the invention in terms of the production of a cylindrical three-dimensional cloth, it is obvious the present invention is not limited to cylindrical shapes.

To produce a cylindrical cloth of this kind, an apparatus as illustrated in FIGS. 2 and 3 is used which essentially consists of a carriage (4) on which the stack (5) of two-directional cloths is disposed and which is moved opposite a stitching head (6) interconnecting the various layers with the third thread extending in the third thread direction. The stitching head (6) may have a known structure and may operate in a known manner similar to that disclosed in U.S. Pat. No. 4,080,915, and will therefore for the sake of simplicity not be described in detail. The carriage (4) consists essentially of a structural frame comprising two upright members (7,8) movably mounted on slides (9,10) (or an equivalent system). The motion of the structural frame (4) may be produced by means of an endless screw system (11) driven by a motor (12). This motion will occur in a stepwise manner below the stitching head and will be conducted as a function of the pitch P of the stitching C which is to extend helically.

In order to produce the helical stitching between the two uprights (7,8) of the structural frame there is mounted a stationary mandrel (12) having a shape that corresponds to that of the internal section of the article to be produced and which, in the present case, is thus cylindrical. The mandrel (12) comprises a slot or gap (13) in its upper part, intended to permit the passage of the stitching needle (14). In accordance with the invention, the stack of cloths (5) is not disposed on the stationary mandrel (12) but is stretched between two end crown rings (15,16). The fastening of the stack onto the bearings (17,18) of the said crown rings (15,16) is effected by any suitable means such as, for example, by means of metal strips. These crown rings (15,16) are mounted on the carriage (4), and more particularly on the upright members (7,8), so as to be capable of being rotated, step by step, over a distance corresponding to the length of the stitches to be produced. In accordance with the invention, it is essential for the stack to be capable of sliding virtually without friction around the mandrel (12) which could even be left out and whose function is nevertheless to facilitate the production of the stitching.

In general, the bearings (17,18) of the crown rings (15,16) are designed so that a slight cavity is defined between the mandrel (12) and the lower layer of the stack (5), the cavity having a depth in the order of 0.5 mm.

By virtue of the method and apparatus of the present invention, it is possible therefore, by synchronizing the rotation of the stack of two-directional cloths and the forward motion of the carriage (4) supporting the stack, to vary not only the length of the stitches of the stitching C but also the pitch P of the spiral stitching.

EXAMPLE

On an apparatus according to the present invention there was formed, by reeling, a stack (5) of two-direcitonal cloths, consisting of fifty layers of woven tape having the following characteristics:

warp and weft texture: glass threads EC 13/300 tex/1383/Z20;

8 satin stitch weave comprising ten warp threads and ten weft threads of the above-mentioned type;

width of the tape: 150 mm;

width of the selvages: ten millimeters;

thickness of the cloth: 40/100 of a millimeter.

The fifty layers of tape were wound around the bearings (17,18) of the two crown rings (15,16) under tension. The stack formed had a thickness of twenty millimeters, the internal diameter of the stack was 120 millimeters.

The ends of the tape were secured to the bearings (17,18) of the crown rings (15,16) by means of a metal strip.

When this wound stack was produced, in accordance with the invention, the various layers were joined together by means of a continuous stitching extending from one end of the wound stack to the other. To accomplish such, the carriage (4) was brought into a set-back position so that the knitting head produced the initial stitch of the stitching at the end of the slot (13) closest to the first crown ring (16). The junction was produced by means of a glass thread EC9/130 tex (68/2)/F150/1583.

The movement of the carriage (4) which determines the pitch of the helix together with the speed of rotation of the crown rings (15,16) was adjusted so that stitching C was formed at a pitch P of six millimeters and with a stitch length of 6.28 millimeters.

Contrary to previous methods to produce similar articles by means of stitched threads which are each continuous and extend parallel to the generatrices of the article to be produced, the method of the present invention may be carried out continuously. Furthermore, by joining the layers with helical stitching, it is possible to produce a much more homogeneous article, because the stack is not compressed when the stitching is produced.

Lastly, it is possible to vary the pitch of the stitching, and hence to select the density of the third threads formed by stitching depending upon the characteristics of the product, particularly when it is desired to produce articles having a conical shape or complex generatrices.

Naturally, the invention is not limited to the embodiment described above, but is drawn to all the alternative forms thereof having the same scope. Thus, for example, it would be possible to produce the stack of two-directional materials by using non-flat cloths, i.e. cylindrical or conical sleeves.

We claim:

1. A three-dimensional multilayer textile article comprising:
    a plurality of superposed elementary layers each of which layers comprises a plurality of first threads extending in a first direction and a plurality of second threads extending in a second direction, said first and said second directions being non-parallel, and said layers being superposed and collectively having a three-dimensional shape in the article, the three-dimensional shape defining first and second end portions of the layers and corresponding to a body of revolution; and
    a third thread joining said layers together, said third thread extending in said layers in a third direction that is non-parallel to each of said first and said second directions, and helically across said superposed layers from said first end portion thereof to said second end portion thereof.

2. A three-dimensional multilayer textile article as claimed in claim 1,
    wherein the pitch of said third thread extending helically is uniform from said first end portion of said superposed layers to said second set end portion thereof.

3. A three-dimensional multilayer textile article as claimed in claim 1,
    wherein the pitch of said third thread extending helically varies from said first end portion of said superposed layers to said second end portion thereof.

* * * * *